United States Patent
Kobler et al.

(10) Patent No.: US 11,598,394 B2
(45) Date of Patent: Mar. 7, 2023

(54) WHEEL HEAD TRANSMISSION FOR A WHEEL HEAD OF A MOTOR VEHICLE DRIVE AXLE, AND WHEEL HEAD

(71) Applicant: ZF Friedrichshafen AG, Friedrichshafen (DE)

(72) Inventors: Matthias Kobler, Perlesreut (DE); Max Schreiber, Tittling (DE); Michael Wechs, Weissenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/441,459

(22) PCT Filed: Mar. 20, 2020

(86) PCT No.: PCT/EP2020/057837
§ 371 (c)(1),
(2) Date: Sep. 21, 2021

(87) PCT Pub. No.: WO2020/193423
PCT Pub. Date: Oct. 1, 2020

(65) Prior Publication Data
US 2022/0163095 A1 May 26, 2022

(30) Foreign Application Priority Data
Mar. 22, 2019 (DE) ...................... 10 2019 203 920.0

(51) Int. Cl.
*B60K 17/00* (2006.01)
*F16H 1/46* (2006.01)
(Continued)

(52) U.S. Cl.
CPC ........... *F16H 1/46* (2013.01); *F16H 57/0018* (2013.01); *F16H 57/082* (2013.01)

(58) Field of Classification Search
CPC ....... F16H 1/46; F16H 57/0018; F16H 57/082
See application file for complete search history.

(56) References Cited

U.S. PATENT DOCUMENTS

| 4,437,530 A * | 3/1984 | De Young ............... B60B 11/06 475/225 |
| 9,550,414 B2 | 1/2017 | Kudo et al. |

(Continued)

FOREIGN PATENT DOCUMENTS

| DE | 11 2013 003 270 T5 | 4/2015 |
| DE | 10 2014 223 213 A1 | 5/2016 |

(Continued)

OTHER PUBLICATIONS

German Search Report Corresponding to 10 2019 203 920.0 dated Nov. 19, 2019.

(Continued)

*Primary Examiner* — Derek D Knight
(74) *Attorney, Agent, or Firm* — Finch & Maloney PLLC (57) ABSTRACT

A wheel head transmission (1) comprising a first and second shafts (W1, W2) which are connected to one another via a planetary transmission (PG). The wheel head transmission (1) comprises first and second planetary stages (P1, P2), which include a first element (E11, E12), a second element (E21, E22) and a third element (E31, E32). The first element (E11) of the first planetary stage (P1) is connected to the first shaft (W1) for conjoint rotation, the second element (E21) of the first planetary stage (P1) and the third element (E32) of the second planetary stage (P2) are connected to one another and the second shaft (W2) for conjoint rotation. The third element (E31) of the first planetary stage (P1) and the first element (E12) of the second planetary stage (P2) are connected together for conjoint rotation, and the second element (E22) of the second planet stage (P2) is immobilized.

17 Claims, 5 Drawing Sheets

(51) Int. Cl.
*F16H 57/00* (2012.01)
*F16H 57/08* (2006.01)

(56) References Cited

U.S. PATENT DOCUMENTS 11,358,468 B2 * 6/2022 Wang ................. H02K 7/1846
2018/0312058 A1   11/2018 Isono
2020/0232547 A1   7/2020 Lindtner

FOREIGN PATENT DOCUMENTS

| | | |
|---|---|---|
| DE | 10 2017 209 462 A1 | 3/2018 |
| DE | 10 2017 006 266 A1 | 1/2019 |
| DE | 10 2017 212 781 A1 | 1/2019 |
| EP | 0 075 484 A2 | 3/1983 |
| WO | 2005/120877 A1 | 12/2005 |

OTHER PUBLICATIONS

International Search Report Corresponding to PCT/EP2020/057837 dated Jul. 9, 2020.
Written Opinion Corresponding to PCT/EP2020/057837 dated Jul. 9, 2020.

* cited by examiner

WHEEL HEAD TRANSMISSION FOR A WHEEL HEAD OF A MOTOR VEHICLE DRIVE AXLE, AND WHEEL HEAD

This application is a National Stage application of PCT/EP2020/057837 filed Mar. 20, 2020, which claims priority from German patent application serial no. 10 2019 203 920.0 filed Mar. 22, 2019.

FIELD OF THE INVENTION

The invention relates to a wheel head transmission for a wheel head of a motor vehicle drive axle, in particular of a drive axle of a construction machine, comprising a first shaft and a second shaft in the form of a drive shaft and an output shaft, which are connected to one another via a planetary transmission. The invention further relates to a wheel head for a motor vehicle drive axle with an aforementioned wheel head transmission.

BACKGROUND OF THE INVENTION

Wheel head transmissions are used, in particular, in motor vehicle drive axles and preferably in this case in construction machines, in order to be able to achieve high reduction ratios. In this case, in addition to achieving a high reduction ratio generally a compact construction of the respective wheel head transmission is also desired.

A wheel head transmission for a motor vehicle drive axle is disclosed in DE 10 2017 209 462 A1, in which a drive shaft and an output shaft are connected to one another via an intermediate planetary transmission. The planetary transmission in this case is formed by a planetary stage which is made up of a first element, a second element and a third element in the form of a sun gear, a planet carrier and a ring gear. Whilst the sun gear is connected to the drive shaft, the planet carrier is connected as the output shaft to a wheel hub. The ring gear is permanently immobilized.

SUMMARY OF THE INVENTION

Proceeding from the above-described prior art, it is thus the object of the present invention to provide a wheel head transmission by which a high reduction ratio may be achieved with a compact construction.

This object is achieved on the basis of the independent claim(s) in conjunction with the characterizing features thereof. The following dependent claims in each case reproduce advantageous developments of the invention. A wheel head for a motor vehicle drive axle, in which an aforementioned wheel head transmission is used, is also the subject matter of independent claim(s).

According to the invention, a wheel head transmission comprises a first shaft and a second shaft, in the form of a drive shaft and an output shaft, which are connected to one another via a planetary transmission. In the wheel head transmission according to the invention, therefore, a planetary transmission is provided between a drive shaft and an output shaft, the drive shaft and the output shaft of the wheel head transmission being permanently coupled together thereby. In this case, the wheel head transmission in a wheel head of a motor vehicle drive axle serves to implement a high reduction ratio, in particular when transmitting a drive movement to a drive wheel which is respectively arranged on the wheel head. Particularly preferably, in this case the wheel head transmission is designed to have a transmission ratio ranging from 8.3 to 8.8.

The drive shaft and the output shaft of the wheel head transmission preferably have in each case one respective connecting point, wherein the connecting point of the drive shaft serves for producing a connection with an upstream drive train of the respective motor vehicle. The connecting point of the output shaft is provided for connecting to a wheel hub for receiving a drive wheel.

The invention thus comprises the technical teaching that the planetary transmission is made up of a first planetary stage and a second planetary stage, which respectively comprise in each case one first element, in each case one second element and in each case one third element in the form of in each case one sun gear, in each case one planet carrier and in each case one ring gear. In this case, the first element of the first planetary stage is connected to the first shaft for conjoint rotation, while the second element of the first planetary stage and the third element of the second planetary stage are connected to one another for conjoint rotation and are jointly connected to the second shaft for conjoint rotation. Furthermore, the third element of the first planetary stage and the first element of the second planetary stage are connected to one another for conjoint rotation, whereas the second element of the second planetary stage is immobilized.

In other words, therefore, the planetary transmission in the wheel head transmission according to the invention is formed by two planetary stages, in each case one first element, in each case one second element and in each case one third element being respectively assigned thereto. Of the respective elements of the individual planetary stage, in this case one element is present as the sun gear, one element is present as the planet carrier and one element is present as the ring gear. Whilst the first element of the first planetary stage is connected to the first shaft for conjoint rotation and the second element of the second planetary stage is permanently immobilized, the second element of the first planetary stage and the third element of the second planetary stage are connected to one another for conjoint rotation, whereas the third element of the first planetary stage and the first element of the second planetary stage are connected to one another for conjoint rotation. The second element of the first planetary stage and the third element of the second planetary stage are also jointly connected to the second shaft for conjoint rotation.

Such an embodiment of a wheel head transmission has the advantage in this case that, by coupling the elements of the planetary stages together, a power branching is implemented inside the wheel head transmission, a high transmission ratio being able to be implemented thereby between the shafts with a compact construction. As a result, a high reduction ratio may be achieved between the first and the second shaft with a compact construction, which makes the wheel head transmission according to the invention suitable for use in a wheel head.

In the wheel head transmission of DE 10 2007 209 462 A1, however, the planetary transmission is designed with a single stage. In order to be able to achieve a high reduction ratio, elements of the planetary stage have to be designed with large dimensions, so that an operational stability of the elements is no longer able to be ensured. Moreover, the wheel head transmission would then be of correspondingly large construction.

A "shaft" within the context of the invention is to be understood as a rotatable component of the transmission, via which in each case the associated components of the transmission, in particular elements of the two planetary stages, are connected to one another for conjoint rotation, or which serves for connecting one respective component of the transmission for conjoint rotation. The respective shaft may connect components axially or radially or even both axially and radially to one another. Thus the respective shaft may also be present as a short intermediate piece via which a radial connection is implemented.

"Axial" within the context of the invention is understood to mean an orientation in the direction of a longitudinal central axis, the planetary stages of the planetary transmission being arranged coaxially to one another along said longitudinal central axis. "Radial" is to be understood to mean an orientation in the direction of the diameter of a shaft which is located on this longitudinal central axis.

One respective connection of the elements of the planetary stages according to the invention for conjoint rotation is preferably implemented via one or more intermediate shafts, which may be present in each case as short intermediate pieces when the elements are positioned spatially closely adjacent to one another. In practice, the elements which are permanently connected to one another for conjoint rotation, are present in each case either as individual components connected to one another for conjoint rotation, or even in one piece. In the second-mentioned case, therefore, the respective elements and the optionally present shaft are formed by a common component, wherein this is implemented, in particular, when the respective elements are located spatially closely adjacent to one another in the transmission.

An immobilizing of the second element of the second planetary stage is implemented, in particular, by a permanent connection for conjoint rotation to a component of the transmission for conjoint rotation, which is preferably a permanently stationary component, preferably a housing of the transmission, a part of such a housing or a component connected thereto for conjoint rotation.

According to one embodiment of the invention, the first shaft is the drive shaft of the wheel head transmission and the second shaft is the output shaft. In this embodiment, the first shaft is present as the drive shaft and the second shaft is present as the output shaft of the wheel head transmission.

In a development of the aforementioned embodiment, the first element of the first planetary stage is the sun gear of the first planetary stage, the second element of the first planetary stage is the planet carrier of the first planetary stage and the third element of the first planetary stage is the ring gear of the first planetary stage. Additionally, the first element of the second planetary stage is present as the sun gear of the second planetary stage, the second element of the second planetary stage is present as the planet carrier of the second planetary stage and the third element of the second planetary stage is present as the ring gear of the second planetary stage. A suitable design of a wheel head transmission may be implemented thereby.

According to an advantageous development, the planetary stages are axially arranged following a connecting point of the drive shaft in the sequence consisting of the first planetary stage and the second planetary stage. As a result, a balanced dimensioning of the wheel head transmission may be implemented, wherein in this case the use of the same parts is possible. Additionally, a simple torque assistance may be achieved. Particularly preferably, in this case the stationary gear ratios of the two planetary stages in each case are −2.25.

According to an alternative development, the planetary stages are axially arranged following a connecting point of the drive shaft in the sequence consisting of the second planetary stage and the first planetary stage. A balanced dimensioning of the wheel head transmission is also achieved thereby, wherein the use of the same parts is possible once again. Moreover, a simple torque assistance may also be achieved here. Also in the case of this development, the stationary gear ratios of the two planetary stages are preferably in each case −2.25.

According to a further alternative development, the planetary stages are axially arranged in one plane, wherein in this case the first planetary stage is positioned radially internally relative to the second planetary stage. Advantageously, the constructional space requirement may be further reduced thereby, with at the same time a balanced dimensioning and simple torque assistance. As a further advantage, the number of components may be reduced thereby since the first element of the second planetary stage and the third element of the first planetary stage may be designed in a simple manner in one piece. In particular, in this case the first planetary stage has a stationary gear ratio of −2.75, whilst in the case of the second planetary stage this stationary gear ratio is preferably −1.75.

In all three aforementioned developments an output-side power branching is achieved in each case.

A further embodiment of the invention is that the first shaft is the output shaft and the second shaft is the drive shaft. In this embodiment, therefore, the first shaft is present as the output shaft and the second shaft is present as the drive shaft of the wheel head transmission.

In a development of the aforementioned embodiment, the first element of the first planetary stage is the planet carrier of the first planetary stage, the second element of the first planetary stage is the sun gear of the first planetary stage and the third element of the first planetary stage is the ring gear of the first planetary stage. Additionally, the first element of the second planetary stage is present as a ring gear of the second planetary stage, the second element of the second planetary stage is present as the planet carrier of the second planetary stage and the third element of the second planetary stage is present as the sun gear of the second planetary stage.

Further preferably, the planetary stages are axially arranged following a connecting point of the drive shaft in the sequence consisting of the second planetary stage and the first planetary stage. As a result, a simple implementation may be achieved, with at the same time simple torque assistance, wherein elements of the planetary stage may be produced in a simple manner. In this case a stationary gear ratio of the first planetary stage is preferably −2.25, whilst in the case of the second planetary stage this stationary gear ratio is preferably −3.6. In the aforementioned embodiment and the developments thereof, in this case a drive-side power branching is respectively implemented.

The wheel head transmission according to the invention is, in particular, part of a wheel head for a motor vehicle drive axle. In this case, a connection to an upstream drive train of the motor vehicle is produced on the drive shaft, whilst the output shaft serves for connecting to a wheel hub for receiving a drive wheel. In this case, the motor vehicle is preferably a construction machine.

The invention is not limited to the specified combination of features of the main claim or the claims dependent thereon. Moreover, there are also possibilities for combining together individual features, and also insofar as they are revealed from the claims, the description of preferred embodiments of the invention or directly from the drawings. The reference of the claims to the drawings by using reference numerals is not intended to limit the protected scope of the claims.

BRIEF DESCRIPTION OF THE DRAWINGS

Advantageous embodiments of the invention which are described hereinafter are shown in the drawings, in which.

DETAILED DESCRIPTION FO THE PREFERRED EMBODIMENTS

Figure 1:
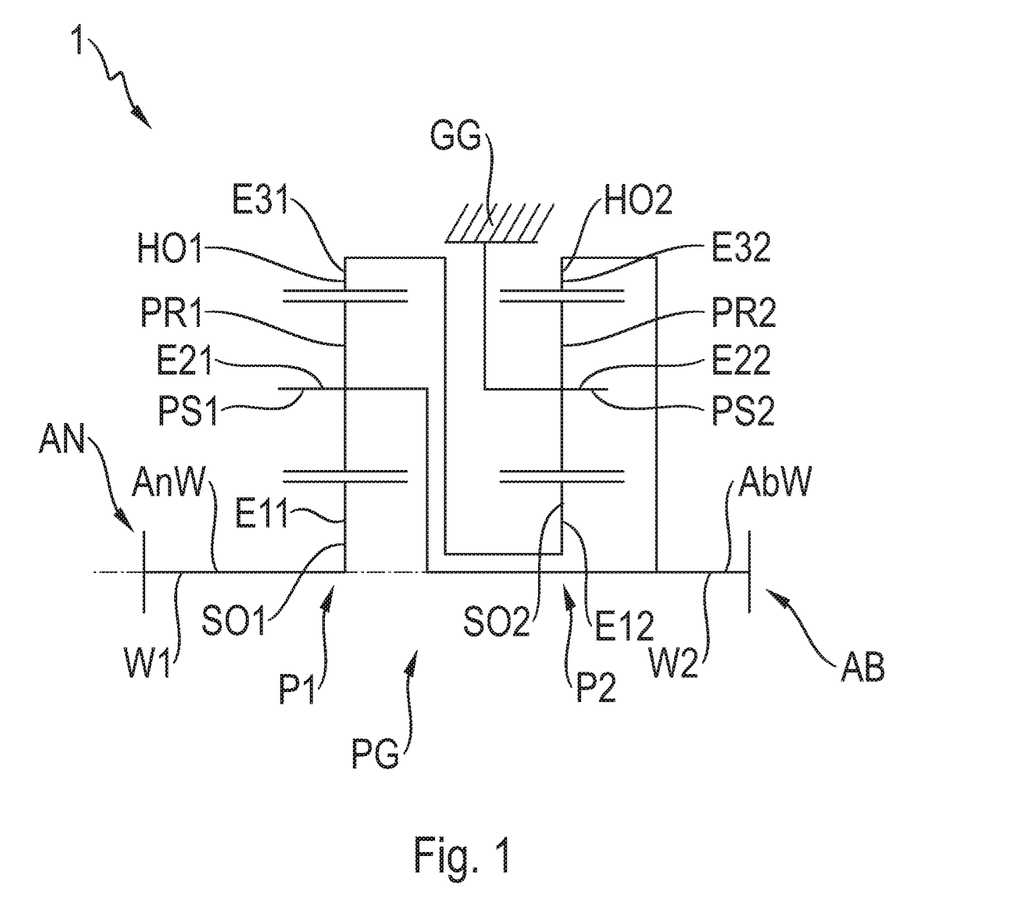
FIG. 1 shows a schematic view of a wheel head transmission according to a first embodiment of the invention.

FIG. 1 shows a schematic view of a wheel head transmission 1 which is designed according to a first embodiment of the invention and is provided for use in a wheel head of a motor vehicle drive axle. Particularly preferably, the wheel head transmission 1, in this case, is used in a wheel head of a drive axle of a construction machine.

Figure 2:
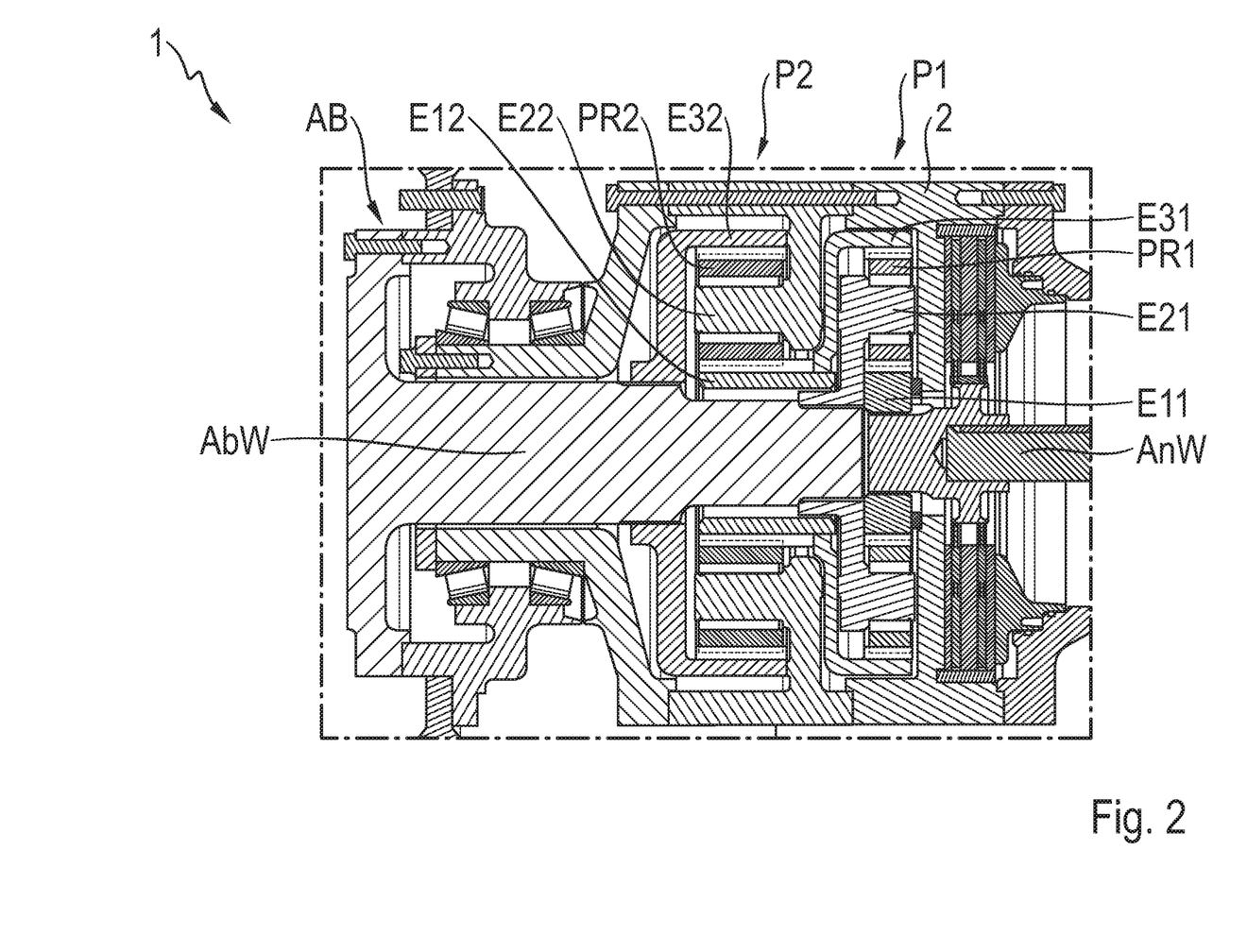
FIG. 2 shows a sectional view of the wheel head transmission of FIG. 1.

As may be seen in FIG. 1 and also the further view in FIG. 2, the wheel head transmission 1 comprises a planetary transmission PG, a first shaft W1 and a second shaft W2 being connected to one another thereby. In this case, the first shaft W1 is a drive shaft AnW of the wheel head transmission 1, whilst the second shaft W2 is present as the output shaft AbW. The drive shaft AnW serves for connecting to an axle transmission of the respective drive axle, wherein the connection, in this case, is made at a connecting point AN of the drive shaft AnW. In contrast, the output shaft AbW is provided for connecting to a wheel hub of one respective drive wheel of the axle, wherein the connection is made here at a connecting point AB. The drive shaft AnW and the output shaft AbW are arranged coaxially to one another.

The planetary transmission PG is made up of two planetary stages P1 and P2 which comprise, in each case, one first element E11 or, respectively, E12, in each case one second element E21 or, respectively, E22 and, in each case, one third element E31 or, respectively, E32. In this case, in the case of the two planetary stages P1 and P2, the respective first element E11 or, respectively, E12, is formed by one respective sun gear SO1 or, respectively, SO2, whilst the respective second element E21 or, respectively, E22 is present as one respective planet carrier PS1 or, respectively, PS2 and the respective third element E31 or, respectively, E32 is present as one respective ring gear HO1 or, respectively, HO2. In this case, at least one planet gear PR1 or, respectively, PR2 is rotatably mounted in the individual planet carrier PS1 or, respectively, PS2, in each case, said planet gear being in toothed engagement with both the respective radially internal sun gear SO1 or, respectively, SO2 and with the respective radially surrounding ring gear HO1 or, respectively, HO2. Particularly preferably, however, the planet carriers PS1 or, respectively, PS2, in each case, guide a plurality of planet gears.

As may also be seen respectively in FIG. 1 and also in FIG. 2, the first element E11 of the first planetary stage P1 is connected for conjoint rotation to the drive shaft AnW, whilst the second element E21 of the first planetary stage P1 is continuously connected for conjoint rotation to the third element E32 of the second planetary stage P2. In this case, the second element E21 of the first planetary stage P1 and the third element E32 of the second planetary stage P2 are additionally continuously connected to the output shaft AbW for conjoint rotation. Moreover, the third element E31 of the first planetary stage P1 and the first element E12 of the second planetary stage P2 are permanently connected to one another for conjoint rotation, whereas the second element E22 of the second planetary stage P2 is continuously immobilized on a component GG for conjoint rotation. In this case, the component GG for conjoint rotation is a housing 2 of the wheel head transmission 1, as may be seen in FIG. 2. By linking the two planetary stages P1 and P2 together, an output-side power branching is implemented at the same time.

The two planetary stages P1 and P2 are located coaxially to the drive shaft AnW and the output shaft AbW, wherein the two planetary stages P1 and P2 are axially arranged, following the connecting point AN of the drive shaft AnW, in the sequence consisting of the first planetary stage P1 and the second planetary stage P2. Moreover, in this case the first planetary stage P1 and the second planetary stage P2 preferably have, in each case, a stationary gear ratio of −2.25 so that a high reduction ratio may be implemented by the output-side power branching.

Figure 3:
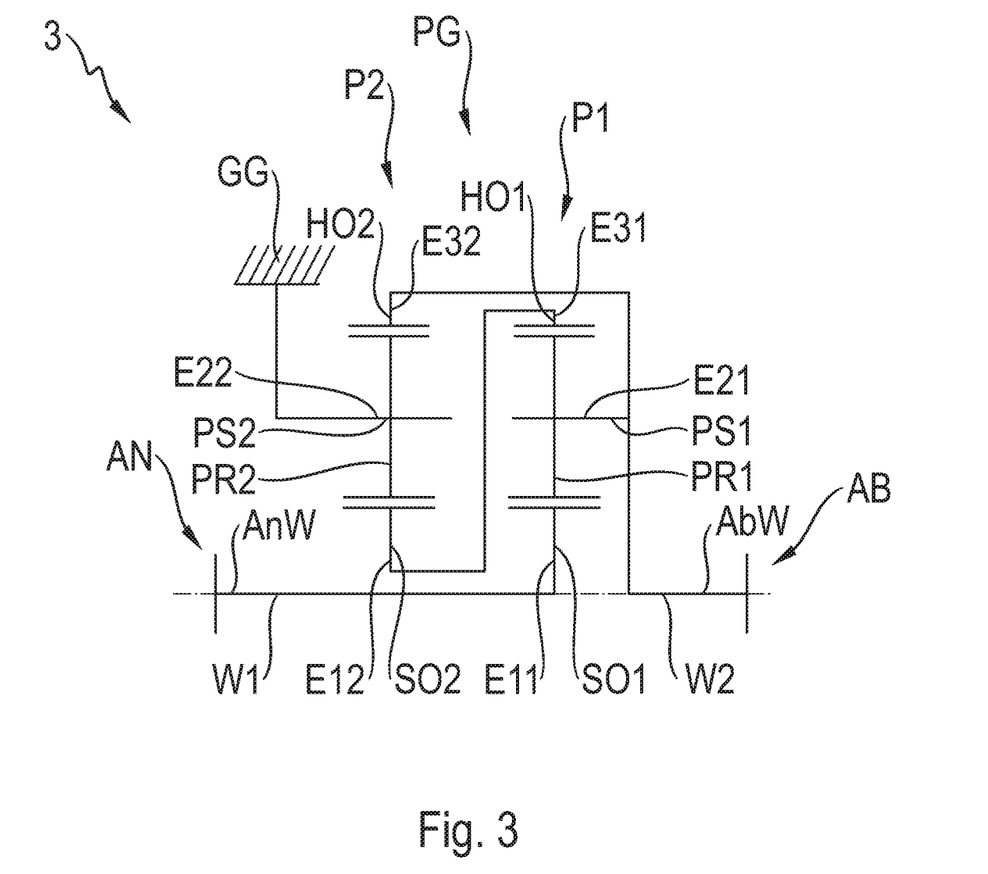
FIG. 3 shows a schematic view of a wheel head transmission corresponding to a second embodiment of the invention.

FIG. 3 also shows a schematic view of a wheel head transmission 3 corresponding to a second embodiment of the invention. In this case, said wheel head transmission 3 substantially corresponds to the variant according to FIGS. 1 and 2, wherein in contrast thereto a first planetary stage P1 and a second planetary stage P2 of a planetary transmission PG are axially arranged following a connecting point AN of a drive shaft AnW in the sequence consisting of the second planet planetary stage P2 and then first planetary stage P1. Accordingly, relative to the variant according to FIGS. 1 and 2, the two planetary stages P1 and P2 have axially exchanged the positions thereof. Otherwise, the embodiment according to FIG. 3 corresponds to the previous variant according to FIGS. 1 and 2, so that reference is made to that described relative thereto.

Figure 4:
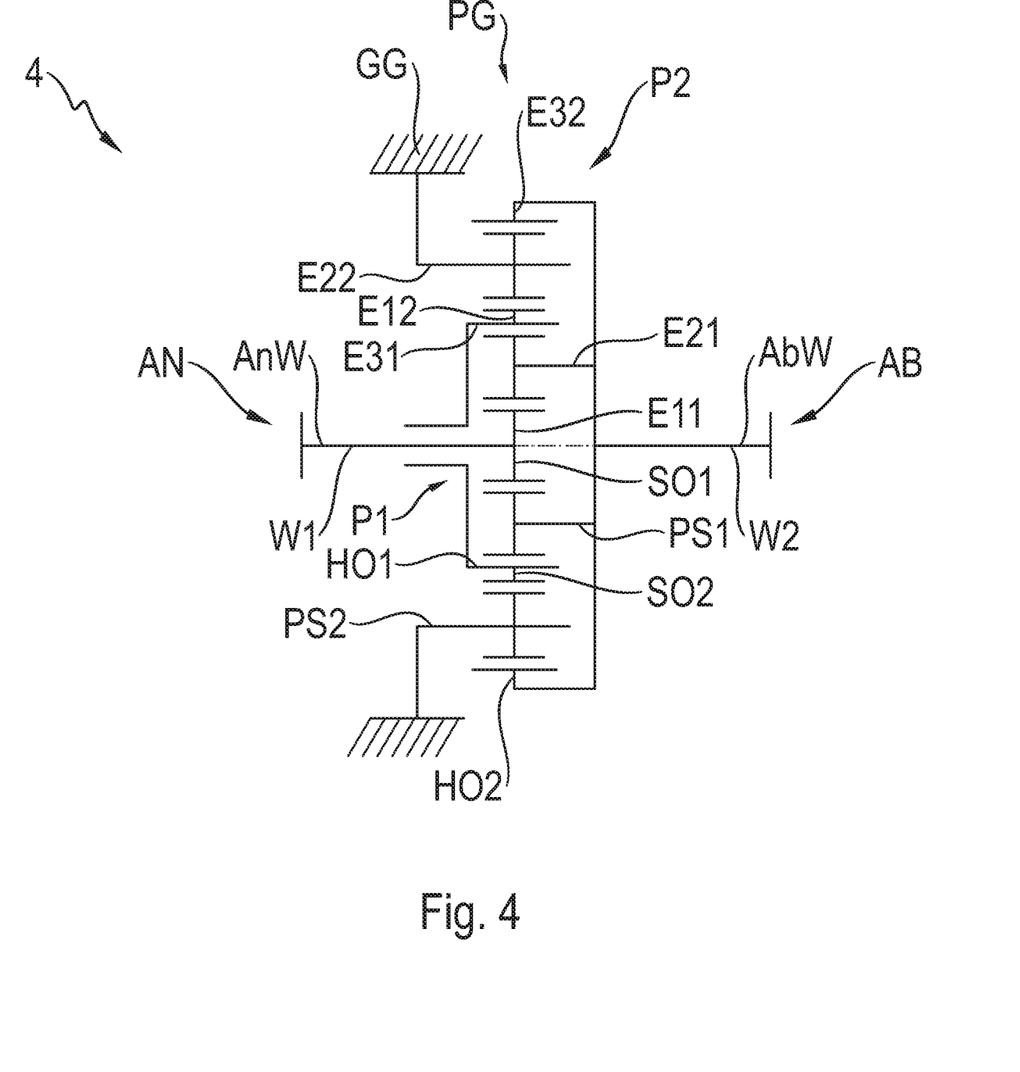
FIG. 4 shows a schematic view of a wheel head transmission according to a third embodiment of the invention.

Revealed from FIG. 4 is a schematic view of a wheel head transmission 4 according to a third embodiment of the invention, which also substantially corresponds to the variant according to FIGS. 1 and 2. The difference here, however, is that the two planetary stages P1 and P2 of the planetary transmission PG are now axially arranged in one plane, wherein, in this case, the first planetary stage P1 is positioned radially internally relative to the second planetary stage P2. In this case, the third element E31 of the first planetary stage P1 and the first element E12 of the second planetary stage P2 are preferably designed as one piece. A stationary gear ratio of the first planetary stage P1 in this case is, in particular, −2.75 whilst the second planetary stage P2 preferably has a stationary gear ratio of −1.75. Otherwise, the embodiment according to FIG. 4 corresponds to the variant according to FIGS. 1 and 2 so that reference is made to that described relative thereto.

Figure 5:
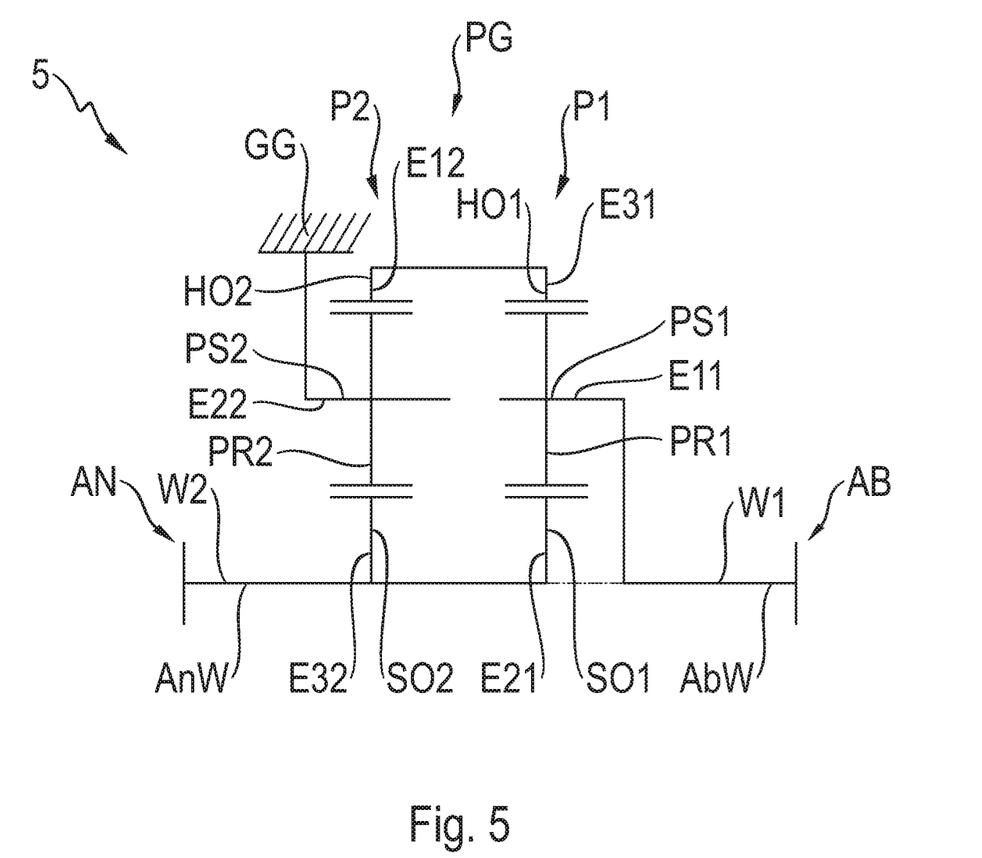
FIG. 5 shows a schematic view of a wheel head transmission corresponding to a fourth embodiment of the invention.

Finally, FIG. 5 shows a schematic view of a wheel head transmission 5 corresponding to a fourth embodiment of the invention. This also substantially corresponds to the variant according to FIGS. 1 and 2, wherein in contrast thereto the first shaft W1 is formed by an output shaft AbW of the wheel head transmission 5, whilst the second shaft W2 is present as the drive shaft AnW. Moreover, in the case of the first planetary stage P1 of the planetary transmission PG, the first element E11 is formed by the planet carrier PS1, whilst the second element E21 of the first planetary stage P1 is now present as the sun gear SO1. In the second planetary stage P2, the first element E12 of the second planetary stage P2 is formed by the ring gear HO2, the second element E22 is formed by the planet carrier PS2 and the third element E32 is formed by the sun gear SO2. Finally, the two planetary stages P1 and P2 axially follow the connecting point AN of the drive shaft AnW in the sequence consisting of the second planetary stage P2 and then the first planetary stage P1. A stationary gear ratio of the first planetary stage P1, in this case, is preferably −2.25, whilst the second planetary stage, in particular, has a stationary gear ratio of −3.6. Otherwise, the embodiment according to FIG. 5 corresponds to the variant according to FIGS. 1 and 2, so that reference is made to that described relative thereto.

In each case, a wheel head transmission which is characterized by a compact construction and a high reduction ratio may be implemented by means of the embodiments according to the invention.

LIST OF REFERENCE NUMERALS

1 Wheel head transmission
2 Transmission housing
3 Wheel head transmission
4 Wheel head transmission
5 Wheel head transmission
W1 First shaft
W2 Second shaft
AnW Drive shaft
AbW Output shaft
AN Connecting point
AB Connecting point
PG Planetary transmission
P1 First planetary stage
P2 Second planetary stage
E11 First element first planetary stage
E21 Second element first planetary stage
E31 Third element first planetary stage
E12 First element second planetary stage
E22 Second element second planetary stage
E32 Third element second planetary stage
SO1 Sun gear
PS1 Planet carrier
PR1 Planet gear
HO1 Ring gear
SO2 Sun gear
PS2 Planet carrier
PR2 Planet gear
HO2 Ring gear
GG Component for conjoint rotation

The invention claimed is:

1. A wheel head transmission, for a wheel head of a motor vehicle drive axle, comprising:
a first shaft,
a second shaft,
the first shaft being one of a drive shaft and an output shaft,
the second shaft being the other of the drive shaft and the output shaft,
the first shaft and the second shaft being connected to one another via a planetary transmission,
wherein the planetary transmission is made up of a first planetary stage and a second planetary stage, the first planetary stage and the second planetary stage each respectively comprise a first element, a second element and a third element, and the first, the second and the third elements comprise a sun gear, a planet carrier and a ring gear,
the first element of the first planetary stage is connected to the first shaft for conjoint rotation therewith,
the second element of the first planetary stage and the third element of the second planetary stage are connected to one another for conjoint rotation and are jointly connected to the second shaft for conjoint rotation,
the third element of the first planetary stage and the first element of the second planetary stage are connected to one another for conjoint rotation,
the second element of the second planetary stage is immobilized, and
the drive shaft and the output shaft are axially aligned, end to end, with one another so that an end face of the drive shaft faces toward an end face the output shaft.

2. The wheel head transmission according to claim 1, wherein the first shaft is the drive shaft and the second shaft is the output shaft.

3. The wheel head transmission according to claim 2, wherein:
the first element of the first planetary stage is the sun gear of the first planetary stage,
the second element of the first planetary stage is the planet carrier of the first planetary stage,
the third element of the first planetary stage is the ring gear of the first planetary stage,
the first element of the second planetary stage is the sun gear of the second planetary stage,
the second element of the second planetary stage is the planet carrier of the second planetary stage, and
the third element of the second planetary stage is the ring gear of the second planetary stage.

4. The wheel head transmission according to claim 2, wherein the first and the second planetary stages are axially arranged, following a connecting point of the drive shaft, in a sequence consisting of the first planetary stage and the second planetary stage.

5. The wheel head transmission according to claim 2, wherein the first and the second planetary stages are axially arranged, following a connecting point of the drive shaft, in a sequence consisting of the second planetary stage and first planetary stage.

6. The wheel head transmission according to claim 2, wherein the first and the second planetary stages are axially arranged in one plane, and the first planetary stage is positioned radially internally of the second planetary stage.

7. The wheel head transmission according to claim 1, wherein the first shaft is the output shaft and the second shaft is the drive shaft.

8. The wheel head transmission according to claim 7, wherein
the first element of the first planetary stage is the planet carrier of the first planetary stage,
the second element of the first planetary stage is the sun gear of the first planetary stage,
the third element of the first planetary stage is the ring gear of the first planetary stage,
the first element of the second planetary stage is the ring gear of the second planetary stage,
the second element of the second planetary stage is the planet carrier of the second planetary stage, and
the third element of the second planetary stage is the sun gear of the second planetary stage.

9. The wheel head transmission according to claim 7, wherein the first and the second planetary stages are axially arranged, following a connecting point of the drive shaft, in a sequence consisting of the second planetary stage and the first planetary stage.

10. A wheel head fora motor vehicle drive axle comprising a wheel head transmission according to claim 1.

11. The wheel head transmission according to claim 1, wherein the wheel head transmission is for a drive axle of a construction machine.

12. A wheel head transmission, for a wheel head of a motor vehicle drive axle, comprising:
a first shaft,
a second shaft,
the first shaft being one of a drive shaft and an output shaft,
the second shaft being the other of the drive shaft and the output shaft,
the first shaft and the second shaft being connected to one another via a planetary transmission,
wherein the planetary transmission is made up of a first planetary stage and a second planetary stage, the first planetary stage and the second planetary stage each respectively comprise a first element, a second element and a third element,
the first element of the first planetary stage is connected to the first shaft for conjoint rotation therewith,
the second element of the first planetary stage and the third element of the second planetary stage are connected to one another for conjoint rotation and are jointly connected to the second shaft for conjoint rotation,
the third element of the first planetary stage and the first element of the second planetary stage are connected to one another for conjoint rotation,
the second element of the second planetary stage is immobilized,
the drive shaft and the output shaft are axially aligned, end to end, with one another and sequentially arranged one after another so that an end face of the drive shaft faces toward an end face the output shaft, and
at least one of the first, the second and the third elements is connected to and extends radially outward from each of the drive shaft and the output shaft.

13. The wheel head transmission according to claim 12, wherein the first shaft is the drive shaft and the second shaft is the output shaft.

14. The wheel head transmission according to claim 13, wherein:
the first element of the first planetary stage is a sun gear of the first planetary stage,
the second element of the first planetary stage is a planet carrier of the first planetary stage,
the third element of the first planetary stage is a ring gear of the first planetary stage,
the first element of the second planetary stage is a sun gear of the second planetary stage,
the second element of the second planetary stage is a planet carrier of the second planetary stage, and
the third element of the second planetary stageis a ring gear of the second planetary stage.

15. The wheel head transmission according to claim 12, wherein the first shaft is the output shaft and the second shaft is the drive shaft.

16. The wheel head transmission according to claim 15, wherein
the first element of the first planetary stage is a planet carrier of the first planetary stage,
the second element of the first planetary stage is a sun gear of the first planetary stage,
the third element of the first planetary stage is a ring gear of the first planetary stage,
the first element of the second planetary stage is a ring gear of the second planetary stage,
the second element of the second planetary stage is a planet carrier of the second planetary stage, and
the third element of the second planetary stage is a sun gear of the second planetary stage.

17. A wheel head transmission, for a wheel head of a motor vehicle drive axle, comprising:
a drive shaft,
an output shaft,
the drive shaft and the output shaft being connected to one another via a planetary transmission,
wherein the planetary transmission is made up of a first planetary stage and a second planetary stage, and each of the first and the second planetary stages comprise a first element, a second element and a third element,
the first element of the first planetary stage is connected to the drive shaft for conjoint rotation therewith,
the second element of the first planetary stage and the third element of the second planetary stage are connected to one another for conjoint rotation and are jointly connected to the output shaft for conjoint rotation,
the third element of the first planetary stage and the first element of the second planetary stage are connected to one another for conjoint rotation, and
the second element of the second planetary stage is immobilized,
wherein the first and the second planetary stages are axially arranged in one plane, and the first planetary stage is positioned radially internally of the second planetary stage.

* * * * *